United States Patent [19]

Olson

[11] 4,443,423

[45] Apr. 17, 1984

[54] METHOD OF REMOVING HYDROGEN SULFIDE FROM GASES UTILIZING A POLYVALENT METAL CHELATE SOLUTION AND ELECTROLYTICALLY REGENERATING THE SOLUTION

[75] Inventor: Donald C. Olson, Houston, Tex.

[73] Assignee: Shell Oil Company, Houston, Tex.

[21] Appl. No.: 430,465

[22] Filed: Sep. 30, 1982

[51] Int. Cl.³ ................... C01B 17/04; B01D 53/34
[52] U.S. Cl. ................... 423/573 G; 423/224; 423/226; 204/129; 204/130; 204/131; 429/17; 429/27
[58] Field of Search ............... 423/224, 226, 573.6, 423/573 R; 429/17, 27; 204/129–131

[56] References Cited

U.S. PATENT DOCUMENTS

| | | | |
|---|---|---|---|
| 1,034,646 | 8/1912 | Rabenalt | 423/573 |
| 2,819,950 | 1/1958 | Patton | 423/573 |
| 3,068,065 | 12/1962 | Hartley et al. | 423/228 |
| 3,580,950 | 5/1971 | Bersworth | 562/565 |
| 3,765,946 | 10/1973 | Werner et al. | 429/13 |
| 4,091,073 | 5/1978 | Winkler | 423/226 |

Primary Examiner—Earl C. Thomas
Attorney, Agent, or Firm—Albert J. Adamcik

[57] ABSTRACT

A process for the removal of $H_2S$ from sour gas streams is disclosed, the process being characterized by the use of a washing or contacting solution containing oxidizing polyvalent metal chelates of specified aminocarboxylic acids, the electrolytic regeneration of spent solution, and the co-production of hydrogen. Provision is also made for selective absorption of $CO_2$.

7 Claims, 3 Drawing Figures

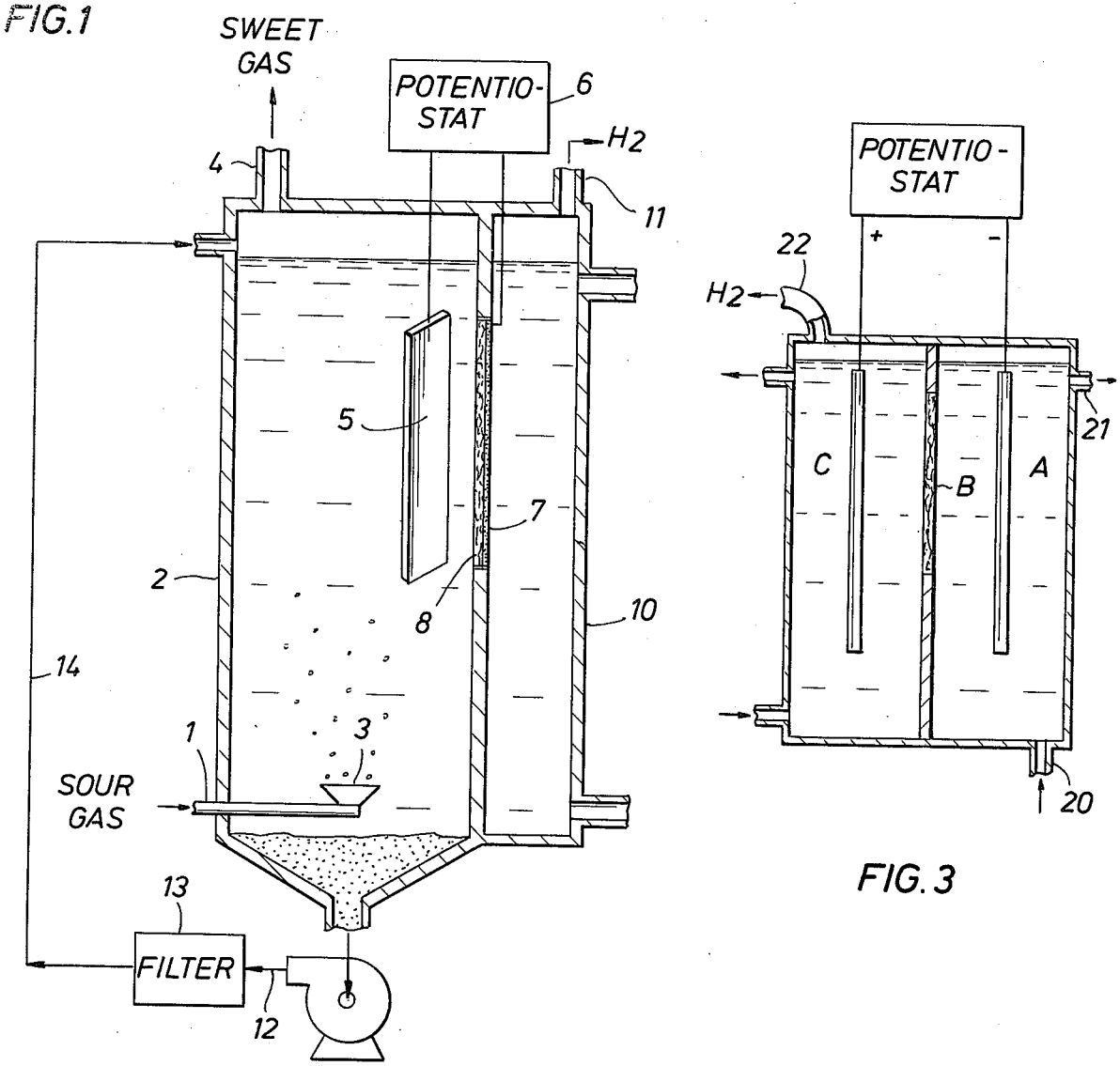
FIG.1
FIG.3
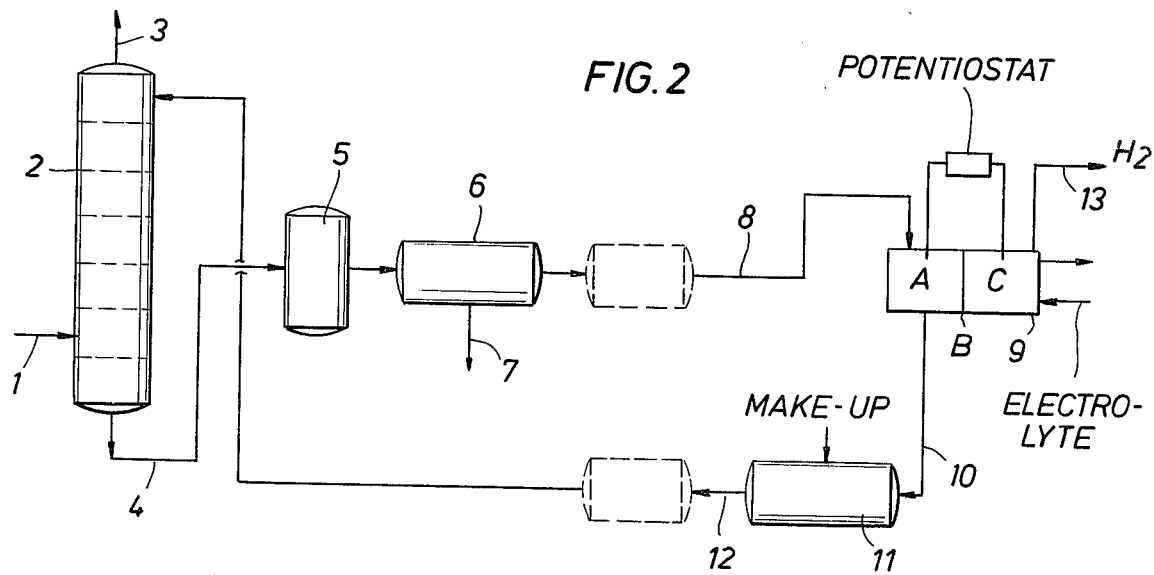
FIG.2

METHOD OF REMOVING HYDROGEN SULFIDE FROM GASES UTILIZING A POLYVALENT METAL CHELATE SOLUTION AND ELECTROLYTICALLY REGENERATING THE SOLUTION

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which iron forms chelates with specified organic ligands.

In yet another process, e.g., that disclosed in U.S. Pat. No. 4,091,073, issued May 23, 1978, to Winkler, $CO_2$ present in the gaseous stream is also removed by the use of a suitable selective absorbent.

Because these "cleanup" processes generally represent significant costs to manufacturing operations, any improvements in such processes which increase their efficiency may have great economic importance. For example, where ligands or chelates of polyvalent metals are employed, chemical degradation or decomposition of the ligand represents an important cost in the process, as well as requiring measures for decomposition bleed or removal and addition of fresh solution. Even in the case of the iron chelate of N-(2-hydroxyethyl) ethylene diamine triacetic acid, ligand decomposition, over a period of time, requires attention to prevent build-up of decomposition products and consequent loss of efficiency.

Evidence exists that degradation of the ligand in such processes may be caused by or enhanced by regeneration of the reduced form of the chelated metal ion with oxygen or an oxygen-containing gas. The invention avoids this problem, and regenerates the ligand in a novel and efficient manner.

SUMMARY OF THE INVENTION

Accordingly, the invention relates to a process for the removal of $H_2S$ from a sour gaseous stream comprising contacting the sour gaseous stream in a contacting zone with an aqueous reaction solution or mixture at a temperature below the melting point of sulfur, the aqueous reaction solution or mixture comprising an effective amount of an oxidizing reactant which is a specified oxidizing polyvalent metal chelate compound or a mixture of such chelate compounds, producing reduced polyvalent metal reactant, and regenerating the reduced reactant electrolytically, as further hereinafter described. A sweet gas stream and elemental sulfur are produced. In one embodiment, the regeneration may be carried out directly in the contacting zone, while in a preferred embodiment, an aqueous admixture containing sulfur and reduced reactant is removed from the contacting zone and electrolytically regenerated, as herein specified. At least a portion of the sulfur crystals may be removed before regenerating the reduced reactant, or at least a portion of the sulfur crystals may be removed after regeneration. Preferably, the sulfur is removed before regeneration of the reactant.

In another embodiment of the invention, a sour gaseous stream containing $H_2S$ and $CO_2$ is contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), and an effective amount of an oxidizing polyvalent metal chelate compound (as specified herein), and mixtures thereof. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate, etc. In the process, the oxidizing polyvalent metal chelate or chelates are reduced, and the sulfur may be treated, as described, supra. The sulfur crystals may be removed prior or subsequent to electrolytic regeneration of the admixture.

The invention also provides, in this embodiment, for the regeneration of the reactant and the absorbent. Preferably, the loaded absorbent mixture containing the reduced polyvalent metal chelate, or mixtures thereof, is regenerated in an electrolytic regeneration zone or zones, as described. The reactant-containing solution is treated prior or subsequent to such electrolytic regeneration, as by heating or pressure reduction, to remove the $CO_2$ (either prior or subsequent to sulfur removal).

As indicated, a key feature of the invention lies in the manner in which the regeneration of the reduced reactant is carried out. In the first embodiment mentioned, a suitable electrode or electrodes are maintained in the solution or admixture in the contacting zone, preferably at some finite distance from the site of the introduction of the $H_2S$, and direct current, such as from a potentiostat, is supplied to such electrodes as an anode, a separate half cell containing a suitable cathode or cathodes also being provided. Allowance is made for passage of hydrogen ion from the contacting zone to the cathode(s), and hydrogen is produced at the cathode(s). The $H_2S$ removal and regeneration of the chelate or chelates is carried out continuously.

Preferably, however, solution or admixture containing reduced reactant is removed from the contact zone, sulfur is removed, and the reduced reactant is oxidized by passing the admixture through the anode section of an electrochemical cell supplied from a D.C. source of potential, the anode removing electrons from the reduced chelate or chelates and converting the reduced metal chelate or chelates to the oxidized metal chelate or chelates. The other half of the cell is used to produce hydrogen. A similar procedure may be employed if a selective absorbent-aqueous reactant mixture is employed. The process, including the regeneration, is preferably carried out continuously, and the cells may be employed in series.

A variety of half cells may be employed in the practice of the invention. Any suitable hydrogen producing half cell may be coupled. Such half cells are known, and form, per se, no part of the invention. Generally, the anode and cathode will be separated by a suitable barrier to prevent reduction of the oxidized polyvalent metal chelate or chelates, the barrier, however, allowing or permitting hydrogen ion transport. Suitable barriers may be selected by those skilled in the art, and include porous or fibrous non-conductive inert materials containing or impregnated with the desired electrolyte. For example, asbestos cloth and microporous polyvinyl chloride may be employed. However, polymeric ion exchange membranes, which also function as electrolytes, may be used to separate the electrodes. For example, Nafion, a perfluorinated carbon polymer with pendant sulfonic groups, as described in IECEC '75 (Intersociety Energy Conversion Engineering Conference) Record, pages 210 through 216, is suitable. Suitable electrodes include, e.g., platinum and carbon, and the hydrogen producing half cell may be as varied, as for example, a carbon electrode in $H_2SO_4$, phosphoric acid, or other acidic electrolytes, or an ion exchange electrolyte such as Nafion with platinum or other suitable electrode material deposited thereon. The reaction may be shown, in the case of iron, for example, as follows:

Anode $2Fe(II)chelate \rightarrow 2Fe(III)chelate + 2e$

Cathode $2H^+ + 2e \rightarrow H_2$

This overall cell reaction has a free energy near zero. Accordingly, the cell will probably in practice require power for the regeneration, as described herein. Protons are provided in the system by the reaction of the $H_2S$ with the Fe(III)chelate, as shown by the following reaction:

$H_2S + 2Fe(III)chelate \rightarrow 2Fe(II)chelate + S + 2H^+$

The particular type of gaseous stream treated is not critical, as will be evident to those skilled in the art. Streams particularly suited to removal of $H_2S$ and $CO_2$ by the practice of the invention are, as indicated, naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may also vary, but may range from about 0.1 percent to about 99 percent or greater by volume. Obviously, the amounts of $H_2S$ and $CO_2$ present are not generally a limiting factor in the practice of the invention.

The temperatures employed in the contacting or absorption-contact zone are not generally critical, except that the reaction is carried out below the melting point of sulfur, and, if an absorbent is used, the temperatures employed must permit acceptable absorption of $CO_2$. In many commercial applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 45° C. are preferred. Contact times will range from about 1 second to about 270 seconds or longer, with contact times of 2 seconds to 120 seconds being preferred.

In the regeneration zone or zones, temperatures may be varied widely. Preferably, the regeneration zone should be maintained at substantially the same temperature as the contacting zone. In general, temperatures of from about 10° C. to 80° C., preferably 20° C. to 45° C., may be employed.

Pressure conditions in the contacting zone may vary widely. If the regeneration is carried out in the contacting zone, the pressure may vary up to the limitations of the electrolytic half cell. If the regeneration is carried out in a separate zone, pressures in the contacting zone may vary from one atmosphere up to one hundred fifty or even two hundred atmospheres, pressures of from one atmosphere to about one hundred atmospheres being preferred. In the regeneration or desorption zone or zones, pressures also may be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, incorporated herein by reference. Preferably, pH in the process of the invention will be in the acid region, i.e., less than 7.

As indicated, the $H_2S$, when contacted, is rapidly converted in the process of the invention by the oxidizing polyvalent metal chelate, or mixtures thereof, to elemental sulfur. Since the polyvalent metal chelates have limited solubility in many solvents or absorbents, if an absorbent is used, the polyvalent metal chelate or chelates are preferably supplied is admixture with the liquid absorbent and water. The amount of oxidizing polyvalent metal chelate, or mixtures thereof, supplied in an effective amount, i.e., an amount sufficient to convert all or substantially all of the $H_2S$ in the gas stream, and will generally be on the order of at least about two mol (basis polyvalent metal) per mol of $H_2S$ converted. Ratios of from about 2 mols to about 15 mols of polyvalent chelate (or chelates) per mol of $H_2S$ may be used, with ratios of from about 2 mols per mol to about 5 mols of polyvalent metal chelate or chelates per mol of $H_2S$ being preferred. The manner of preparing the admixture containing an absorbent is a matter of choice. For example, the chelate or chelates may be added to the absorbent, and, if necessary, then water added. The amount of water added is not critical but must be sufficient to achieve solution of the polyvalent metal chelate or chelates, and can be determined by routine experimentation. Since the polyvalent chelate or chelates may have a significant solubility in the solvent, and since water is produced by the reaction of the $H_2S$ and the metal of the chelate(s), precise amounts of water to be added cannot be given. In the case of absorbents having a low solubility for the chelate, approximately 5 percent to 10 percent water by volume, based on the total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. An oxidizing polyvalent metal chelate solution will generally be supplied as an aqueous solution having a concentration of from about 0.1 molar to about 1 molar, and a concentration of about 1.0 molar is preferred. The ligand to metal molar ratio may range from 1.0 to 2.0, preferably 1.2 to 1.4.

Any oxidizing polyvalent metal, or mixtures thereof, for the chelate compound may be used, but iron, copper and manganese are preferred, particularly iron. The polyvalent metal should be capable of oxidizing hydrogen sulfide, while being reduced itself from a higher to a lower valence state, and should then be oxidizable from the lower valence state to the higher valence state in a typical redox reaction. Other polyvalent metals which may be used include lead, mercury, palladium, platinum, tungsten, nickel, chromium, cobalt, vanadium, titanium, tantalum, zirconium, molybdenum, and tin.

Preferred reactant materials are coodination complexes in which polyvalent metals form chelates with ligand having the formula

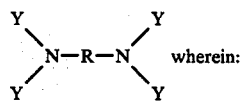

from two to four of the groups Y are selected from acetic and propionic acid groups;
from zero to two of the groups Y are selected from 2-hydroxy ethyl, 2-hydroxy propyl, and

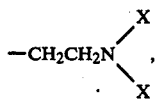

wherein X is selected from acetic and propionic acid groups; and
R is ethylene, propylene or isopropylene or alternatively cyclohexane or benzene where the two hydrogen atoms replaced by nitrogen atoms are in the 1,2 position; and mixtures thereof.

The polyvalent metal chelates are readily formed in aqueous solution by reaction of an appropriate salt, oxide or hydroxide of the polyvalent metal and the chelating agent in the acid form or an alkali metal or ammonium salt thereof. Exemplary chelating agents include hydroxyethyl amino acetic acids derived from ethylenediamine, diethylene triamine, 1,2-propylene diamine, and 1,3-propylene diamine, such as EDTA (ethylene diamine tetraacetic acid), HEDTA N-(2-hydroxy ethyl)ethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylene-diamine-N,N-tetraacetic acid, and the amides of polyamino acetic acids disclosed in Bersworth U.S. Pat. No. 3,580,950. The ferric chelate of N-(2-hydroxyethyl)ethylenediamine triacetic acid is preferred.

The absorbents employed in this invention are those liquid absorbents which have a high degree of selectivity in absorbing $CO_2$ (and preferably $H_2S$ as well) from the gaseous streams. Any of the known absorbents conventionally used which do not affect the activity of the polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol mono ethyl-ether, propylene carbonate, tetra-ethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

The manner of recovering the sulfur is a matter of choice. For example, the sulfur may be recovered by settling, filtration, liquid extraction or flotation, or by suitable devices, such as a hydroclone. Preferably, the sulfur is removed prior to regeneration.

In order to illustrate the invention, reference is made to the accompanying schematic drawing. Parameter values given herein are calculated or are merely exemplary, and should not be taken as delimiting the invention.

FIG. 1 illustrates the first embodiment of the invention,

FIG. 2 illustrates a preferred $H_2S$ removal process regeneration system, while, FIG. 3 illustrates a preferred electrode system.

In FIG. 1, sour natural gas containing, for example, 0.5 percent by weight of $H_2S$, based on the total weight of the gas, from line (1) enters contactor (2) via a sparger (3). The gas, preferably as fine bubbles, is contacted in contactor (2) with a 0.1 M solution of the ferric chelate of N-(2-hydroxyethyl)ethylenediamine triacetic acid. The $H_2S$ is immediately converted to sulfur and H+ ions, and ferric chelate of N-(2-hydroxyethyl)ethylenediamine triacetic acid is immediately converted to ferric chelate of N-(2-hydroxyethyl)ethylenediamine triacetic acid. "Sweetened" natural gas passed overhead via line or outlet (4) to use or further treatment. Contactor (2) also contains a platinum anode (5), which is connected electrically through a load (6) to a cathode (7). Cathode (7) is mounted opposite an opening in the wall of contactor (2) in a chamber (10) which contains 0.1 to 1.0 $H_2SO_4$ in such manner that it is in contact with hydrogen ion permeable membrane (8) which covers the opening. The membrane (8) preferably comprises a substance, such as Nafion, and the cathode, which may simply be a porous carbon coating on the membrane, preferably contains platinum particles.

As the reduced chelate is formed in solution, it is promptly oxidized at anode (5) by virtue of a potential difference of 2 volts across the cell. Concomitantly, hydrogen ions migrate through the membrane to the porous carbon cathode, receive electrons there, and form molecular hydrogen. The hydrogen gas is removed via (11). The procedure is preferably conducted continuously, sulfur-containing reactant solution being removed from the bottom of contactor (2), as shown, and passed via line (12) to filter (13) where sulfur is removed. Other means of sulfur removal may be employed. After sulfur removal, the solution is returned via line (14) to contactor (2).

In FIG. 2, sour gas, e.g., natural gas containing about 0.5 percent H₂S, in line (1) enters contactor or column (2) (tray type) into which also enters an aqueous admixture comprising an aqueous 1.0 M solution of the Fe(III) chelate of N-(2-hydroxy ethyl)ethylenediaminetriacetic acid from line 12. The pressure of the feed gas is about 1200 p.s.i.g., and the temperature of the aqueous admixture is about 45° C. A contact time of about 120 seconds is employed in order to react all the H₂S. Purified or "sweet" gas leaves column 2 through line 3. The "sweet" gas is of a purity sufficient to meet standard requirements. In the admixture, the H₂S is converted to elemental sulfur by the Fe(III) chelate, the Fe(III) chelate in the process being converted to the Fe(II) chelate. The aqueous admixture, containing the elemental sulfur, is removed continuously and sent through line 4 to a depressurization and degassing unit 5, and then to a separation zone. The separation zone 6 preferably comprises a unit, such as filter or centrifuge 6, for separating the bulk of the sulfur produced from the aqueous admixture. It is not necessary that all sulfur be removed from the admixture. Sulfur is removed via line 7, and may be further treated, as desired. Concomitantly, the aqueous admixture is removed via line 8 for regeneration of the chelate. If the aqueous admixture contains a solvent for CO₂, according to that embodiment of the invention, it may suitably be stripped at this point, or after regeneration (shown in dotted lines). If steam is used, the solution must be cooled before re-use.

To regenerate, the admixture in line 8 enters the anode section A of cell 9 (direct current supplied, as shown) where reduced reactant, i.e., the Fe(II) chelate of N-(2-hydroxyethyl)ethylene diamine triacetic acid, is oxidized at a carbon or other suitable electrode to the Fe(III) chelate of N-(2-hydroxyethyl)ethylene diamine triacetic acid. A potential of 2 volts is utilized across the cell. Regenerated reactant mixture leaves section A via line 10, preferably to a holding tank 11, from whence it may be returned via line 12 to contactor 2. Section A is separated from cathode section C by a hydrogen ion permeable barrier B. Section C receives H⁺ ion from section A, and hydrogen is removed overhead via line 13. Those skilled in the art will recognize that this description of cell 9 is merely illustrative and that a multiple cell unit should, in fact, be employed.

FIG. 3 illustrates schematically a cell which may be used to produce hydrogen in the regeneration step of the invention. The aqueous admixture enters the anode section A through line 20. The cell has a potential of 2 to 3 volts across the electrodes. In anode section A, the reduced iron(II) chelate of N-(2-hydroxyethyl)ethylene diamine triacetic acid is oxidized at the anode to the Fe(III) chelate. Regenerated aqueous reactant solution leaves section A through 21, and may be returned to the contact zone for further H₂S removal. Concomitantly, H₂ is produced in cathode section C at a platinum electrode, and is removed through line 22. The solution in this half cell is a 0.1 to 1 M solution of H₂SO₄, and this solution is separated from section A by a hydrogen ion barrier at B.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

What is claimed is:

1. A process for the removal of H₂S from a sour gaseous stream comprising
    (a) contacting the sour gaseous stream in a contacting zone with an aqueous reaction solution at a temperature below the melting point of sulfur, the solution containing an effective amount of a reactant comprising an oxidizing polyvalent metal chelate of an acid having the formula

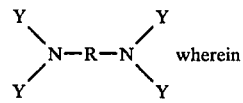

wherein
from two to four of the groups Y are selected from acetic and propionic acid groups;
from zero to two of the groups Y are selected from 2-hydroxy ethyl, 2-hydroxy propyl, and

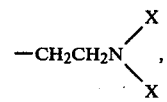

wherein X is selected from acetic acid and propionic acid groups; and
R is ethylene, propylene or isopropylene or alternatively cyclohexane or benzene where the two hydrogen atoms replaced by nitrogen atoms are in the 1,2 position; and mixtures thereof, and producing a sweet gas stream and an aqueous admixture containing crystalline sulfur, hydrogen ions, and the reduced polyvalent metal chelate of said acid, or mixtures thereof; said contacting zone comprising an anode section of an electrochemical cell, said cell also comprising a separate cathode section containing a cathode connected through an external electrical convention to the anode, the anode section and the cathode section being separated by a hydrogen ion permeable barrier,
    (b) oxidizing the reduced polyvalent metal chelate or chelates of said acid in the aqueous reaction solution at the anode by supplying direct current to said cell, concomitantly allowing hydrogen ions to migrate to the cathode, and producing hydrogen at the cathode;
    (c) removing sulfur from the aqueous reaction solution, and hydrogen from the cathode section.

2. A process for the removal of H₂S from a sour gaseous stream comprising (a) contacting the sour gaseous stream in a contacting zone with an aqueous reaction solution at a temperature below the melting point of sulfur, the solution containing an effective amount of a reactant comprising an oxidizing polyvalent metal chelate of an acid having the formula

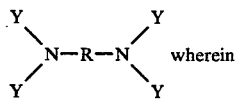

wherein from two to four of the groups Y are selected from acetic and propionic acid groups;

from zero to two of the groups Y are selected from 2-hydroxy ethyl, 2-hydroxy propyl, and

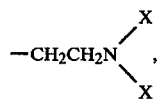

wherein X is selected from acetic acid and propionic acid groups; and

R is ethylene, propylene or isopropylene or alternatively cyclohexane or benzene where the two hydrogen atoms replaced by nitrogen atoms are in the 1,2 position; or mixtures thereof, and producing a sweet gas stream and an aqueous admixture containing crystalline sulfur, hydrogen ions, and the reduced polyvalent metal chelate of said acid, or mixtures thereof;

(b) regenerating aqueous admixture from step (b) electrolytically by passing admixture from step (b) through the anode section of an electrochemical cell and supplying direct current to said cell to oxidize reduced polyvalent metal chelate or chelates in the admixture at the anode and producing a regenerated aqueous admixture containing regenerated reactant, the anode section and the cathode section of said cell being separated by a hydrogen ion permeable barrier, concomitantly allowing hydrogen ions to migrate to the cathode section, and producing hydrogen at the cathode; therefor;

(c) removing regenerated aqueous admixture from said anode section, and molecular hydrogen from said cathode section; and (d) returning regenerated aqueous admixture to the contacting zone.

3. The process of claim 2 wherein the oxidizing polyvalent metal chelate is the ferric chelate.

4. The process of claim 2 wherein the reactant comprises the ferric chelate of N-(2-hydroxyethyl)ethylenediamine triacetic acid.

5. The process of claim 2 wherein the aqueous reaction solution comprises a liquid absorbent selective for $CO_2$.

6. The process of claim 3 wherein the aqueous reaction solution comprises a liquid absorbent selective for $CO_2$.

7. The process of claim 4 wherein the aqueous reaction solution comprises a liquid absorbent selective for $CO_2$.

* * * * *